(12) United States Patent
Auer

(10) Patent No.: US 6,247,268 B1
(45) Date of Patent: Jun. 19, 2001

(54) HYDROPONIC DEVICE

(76) Inventor: Ronald K. Auer, 700 NW. Gillman Blvd., Suite E103-264, Issaquah, WA (US) 98027

( * ) Notice: Subject to any disclaimer, the term of this patent is extended or adjusted under 35 U.S.C. 154(b) by 0 days.

(21) Appl. No.: 09/028,090

(22) Filed: Feb. 23, 1998

(51) Int. Cl.[7] .................................................. A01G 31/00
(52) U.S. Cl. ........................ 47/62 R; 47/62 A; 47/62 C; 47/79
(58) Field of Search ................................. 47/62 R, 62 A, 47/62 C, 62 E, 62 N, 59, 79

(56) References Cited

U.S. PATENT DOCUMENTS

| | | | |
|---|---|---|---|
| 4,021,964 | * | 5/1977 | Darwin et al. ...................... 47/62 R |
| 4,211,034 | * | 7/1980 | Piesner ................................. 47/62 E |
| 4,255,896 | * | 3/1981 | Carl ..................................... 47/62 C |
| 4,279,101 | * | 7/1981 | Leroux ................................... 47/64 |
| 4,310,990 | * | 1/1982 | Payne ..................................... 47/59 |
| 4,533,083 | * | 8/1985 | Tucker ................................. 239/534 |
| 4,926,585 | * | 5/1990 | Dreschel ................................ 47/64 |
| 5,252,108 | * | 10/1993 | Banks ................................. 47/62 C |
| 5,287,652 | * | 2/1994 | Delp ....................................... 47/79 |
| 5,394,647 | * | 3/1995 | Blackford, Jr. ...................... 47/62 A |

* cited by examiner

Primary Examiner—Charles T. Jordan
Assistant Examiner—Judith A. Nelson

(57) ABSTRACT

The improved hydroponic device is an invention that because of its unique design, is readily constructed by mostly standard off the shelf components. The invention is self contained, self cleaning, adjusts to various grow methods, is capable of pumpingly evacuating it's liquid contents, employs a pressure equalizing liquid harness and unique quick insert and quick release plant support baskets, and is modularly expandable.

7 Claims, 6 Drawing Sheets

HYDROPONIC DEVICE

BACKGROUND OF THE INVENTION

The present invention relates to soiless or reduced soil plant growth devices commonly known as hydroponic devices. The invention has particular application for use in growing plants, especially at accelerated rates, in limited space.

It is well known that hydroponic devices have existed for some time, are widely commercially available, and are an effective means to provide predetermined nutrient delivery amounts and rates of feed to cause accelerated plant growth in limited spaces. The following are some examples of prior art hydroponic devices: U.S. Pat. Nos. 5,394,647; 5,287,652; 4,926,585; 4,310,990; 4,279,101; and 4,211,034. It is also well known that many of these devices have been awkward to use, dedicated to only one type of growth method, incapable of pumpingly evacuating their liquid contents thus limiting use location, void of pressure equalizing plumbing thus requiring greater pump pressure for a given system size, of limited modularization or not comprised of readily available off the shelf components, and lacking the ability to self clean. In particular, U.S. Pat. No. 5,394,647 discloses a self contained hydroponic device, yet such device is shown and described to have plumbing lines or tubes outside of the main body of the device.

SUMMARY OF THE INVENTION

The present invention relates to an improved modular self contained hydroponic device which in general comprises readily available off the shelf tubing sections that are sealingly attached together to define a liquid tight container. One portion of the container includes a plurality of openings which receive plant support baskets. The container includes a plumbing system which provides for liquid nutrient delivery to the plant support baskets.

It shall be noted that it is an object of the present invention to provide a hydroponic device which is self contained within a structure comprised of an assembly of standard tubing sections.

It is another object of the present invention to provide a hydroponic device which is readily changeable to adapt to different grow methods such as changing from an ebb and flow grow method to a drip grow method.

It is another object of the present invention to provide a hydroponic device which is capable of pressurizingly discharging it's liquid contents. For instance, when a standard hose is mounted to the exit port of the hydroponic device, the hydroponic device is capable of pumping its liquid contents to an elevation above the hydroponic device, thus increasing the number of usable locations of the hydroponic device.

It is another object of the present invention to provide a hydroponic device which provides pressure equalization plumbing thus reducing the amount of pump pressure required for a given hydroponic device.

It is another object of the present invention to provide a hydroponic device which provides quick assembly and quick release plant support baskets.

It is another object of the present invention to provide a hydroponic device which provides modular adjustment of plant growth capacity.

It is another object of the present invention to provide a hydroponic device which provides for recirculation of it's liquid contents thus reducing the need for manual mixing of the liquid contents of the hydroponic device.

It is another object of the present invention to provide a hydroponic device which provides for filtering of it's liquid contents and thus provides for self cleaning of the hydroponic device.

DESCRIPTION OF DRAWINGS

The objects and many attendant advantages of this invention will be readily appreciated and become readily apparent as the same becomes better understood by reference to the following detailed description, when considered in conjunction with the accompanying drawings and in which like reference numerals designate like parts throughout the figures thereof and wherein.

DETAILED DESCRIPTION OF THE PREFERRED EMBODIMENT

In order to facilitate the understanding of the present invention in reviewing the drawings accompanying the specification, a feature list is provided below. It is noted that like features are like numbered throughout all of the figures.

FEATURE TABLE

| Number | Feature |
|---|---|
| 10 | Hydroponic device in general |
| 20 | Lower tee member in general |
| 22 | Lower tee member first lower opening |
| 24 | Lower tee member second lower opening |
| 26 | Lower tee member upper opening |
| 30 | Connecting sleeve in general |
| 32 | Connecting sleeve lower opening |
| 34 | Connecting sleeve upper opening |
| 40 | Upper tee member in general |
| 42 | Upper tee member lower opening |
| 44 | Upper tee member upper opening |
| 46 | Upper tee member central opening |
| 50 | Grow tube in general |
| 52 | Grow tube first opening |

-continued

FEATURE TABLE

| Number | Feature |
|---|---|
| 54 | Grow tube second opening |
| 56 | Grow tube cut out in general |
| 57 | Grow tube cut out upper edge |
| 58 | Grow tube cut out lower edge |
| 60 | Elbow member in general |
| 62 | Elbow member lower opening |
| 64 | Elbow member upper opening |
| 70 | Support sleeve in general |
| 72 | Support sleeve lower opening |
| 74 | Support sleeve upper opening |
| 80 | End cap in general |
| 90 | Pump in general |
| 100 | Combination fill/overboard valve in general |
| 102 | Nutrient delivery valve in general |
| 104 | Filtering/recirculation valve in general |
| 110 | Combination fill/overboard evacuation port in general |
| 120 | Baffle bulkhead in general |
| 122 | Baffle opening for nutrient supply tube |
| 124 | Baffle liquid passage opening |
| 126 | Baffle liquid passage opening in first alternate position |
| 128 | Baffle liquid passage opening in second alternate position |
| 130 | A portion of a nutrient supply tube in general |
| 140 | Solid bulkhead in general |
| 150 | Plant support basket in general |
| 152 | Typical basket opening in general |
| 160 | Basket bracket in general |
| 162 | Typical basket bracket prong in general |
| 164 | Basket bracket exploded in untightened position |
| 166 | Basket bracket exploded in tightened position |
| 168 | Basket bracket engaged in tightened position |
| 170 | Liquid level - baffle in nominal position |
| 172 | Liquid level - baffle in first alternate position |
| 174 | Liquid level - baffle in second alternate position |
| 176 | Liquid passage line in general |
| 178 | Liquid flow direction arrow in general |
| 180 | Multiple grow tube feeding pressure equalizing liquid harness in general |
| 182 | Individual plant site feeding pressure equalizing liquid harness in general |
| 184 | Plant site in general |

Figure 6:
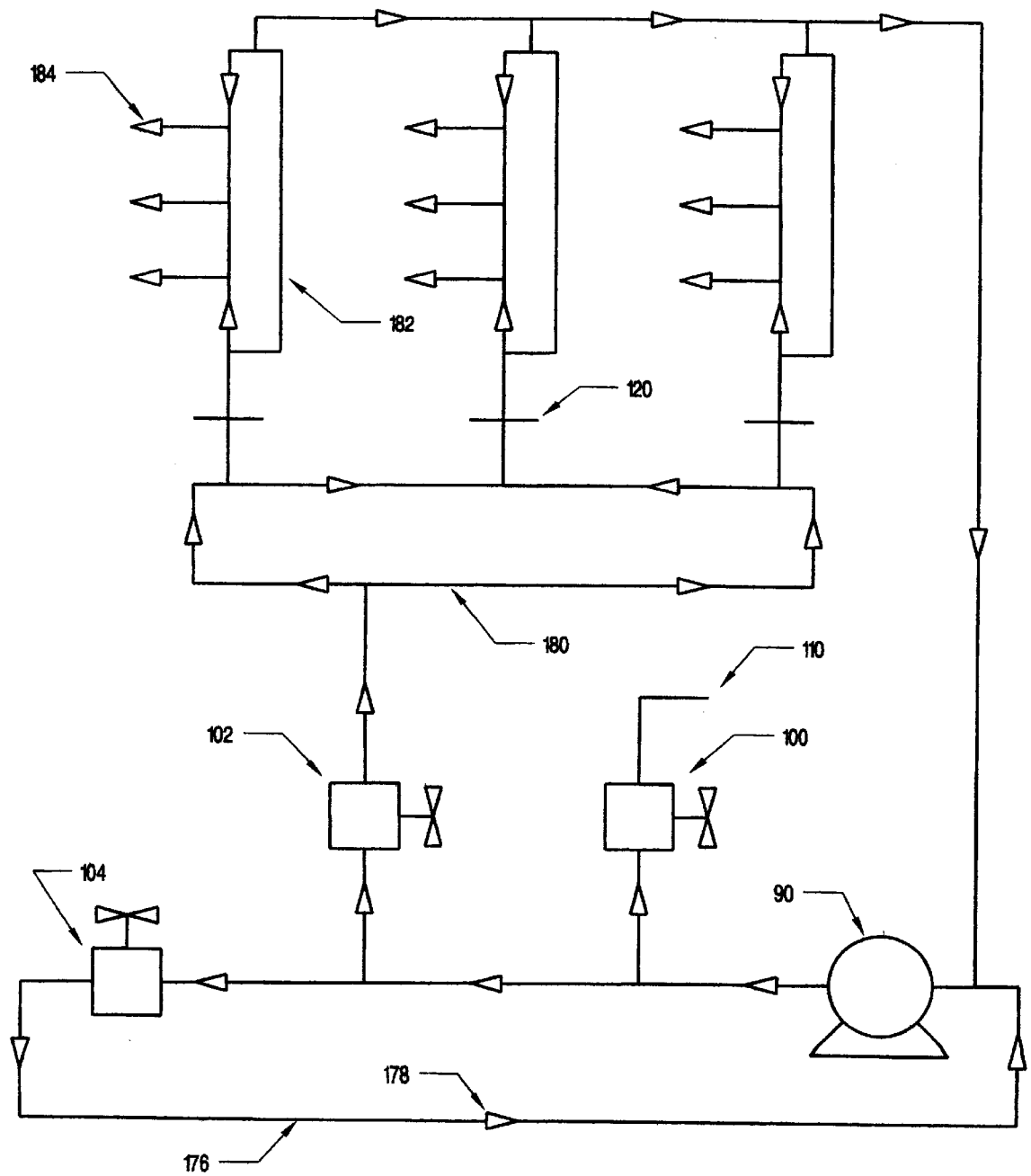
FIG. 6 is a schematic drawing of the improved hydroponic device defining the liquid nutrient flow path of the device.

Referring now to the drawings, the invention is a hydroponic device 10 that comprises a lower tee 20, a connecting sleeve 30, an upper tee 40, a grow tube 50, an elbow 60, a support sleeve 70, end caps 80, a pump 90, a fill/overboard valve 100, a nutrient delivery valve 102, a filtering/recirculation valve 104, a fill/overboard port 110, a baffle bulkhead 120, nutrient supply tubes 130, a solid bulkhead 140, a plant support bracket 150, basket brackets 160, and a plant site feeding pressure equalizing liquid harness 182. End caps 80 are sealingly mounted within lower tee openings 22 and 24. Valves 100, 102, and 104 are fixed and rotatably mounted to lower tee 20. Pump 90 is located within tee 20 and rests on an inner surface of tee 20. Lower tee 20 and upper tee 40 are sealingly connected by joining connecting sleeve lower opening 32 within lower tee upper opening 26 and by joining connecting sleeve upper opening 34 within upper tee lower opening 42. Fill/overboard port 110 is mounted to upper tee 40. Baffle bulkhead 120 is attached in rotating relationship to nutrient supply tube portion 130 by insertion of tube 130 through baffle opening 122. Bulkheads 120 are mounted within grow tube 50 by sealingly mounting bulkhead 140 into grow tube opening 54 and by rotatably mounting bulkhead 120 into grow tube opening 52. Grow tube 50 connects upper tee 40 and elbow 60 by sealingly mounting grow tube opening 52 within upper tee central opening 46 and by maounting grow tube opening 54 within elbow upper opening 64. Support sleeve 70 is fixedly mounted within elbow lower opening 62. Two basket brackets 160 are snappingly engaged to basket 150 by inserting bracket prongs 162 through basket openings 152. Baskets 150 are mounted to grow tube cut out 56 by snappingly engaging basket mounted brackets 160 below grow tube cut out upper edges 57 and subsequently rotating basket 150 approximately 90 degrees such that basket mounted brackets 160 come into tightened engagement with cut out lower edges 58. The pump 90, valves 100, 102, and 104, fill/overboard port 110, and plant sites 184 are all connected as schematically displayed in FIG. 6 such that liquid is sealingly and pressurizable transmissible in the directions indicated in FIG. 6. In a alternate embodiment, an end cap 80 is removably inserted into upper tee upper opening 44. In yet another embodiment, additional plant growth capacity is obtained by connecting additional branches of the hydroponic device to the lower tee 20. In such embodiment, an additional connecting sleeve 30 connects a first lower tee to a second lower tee. The second lower tee has substantially identical members connected to it as does the first lower tee, however the second lower tee is also connected to the same pump that powers the entire hydroponic device.

Figure 1:
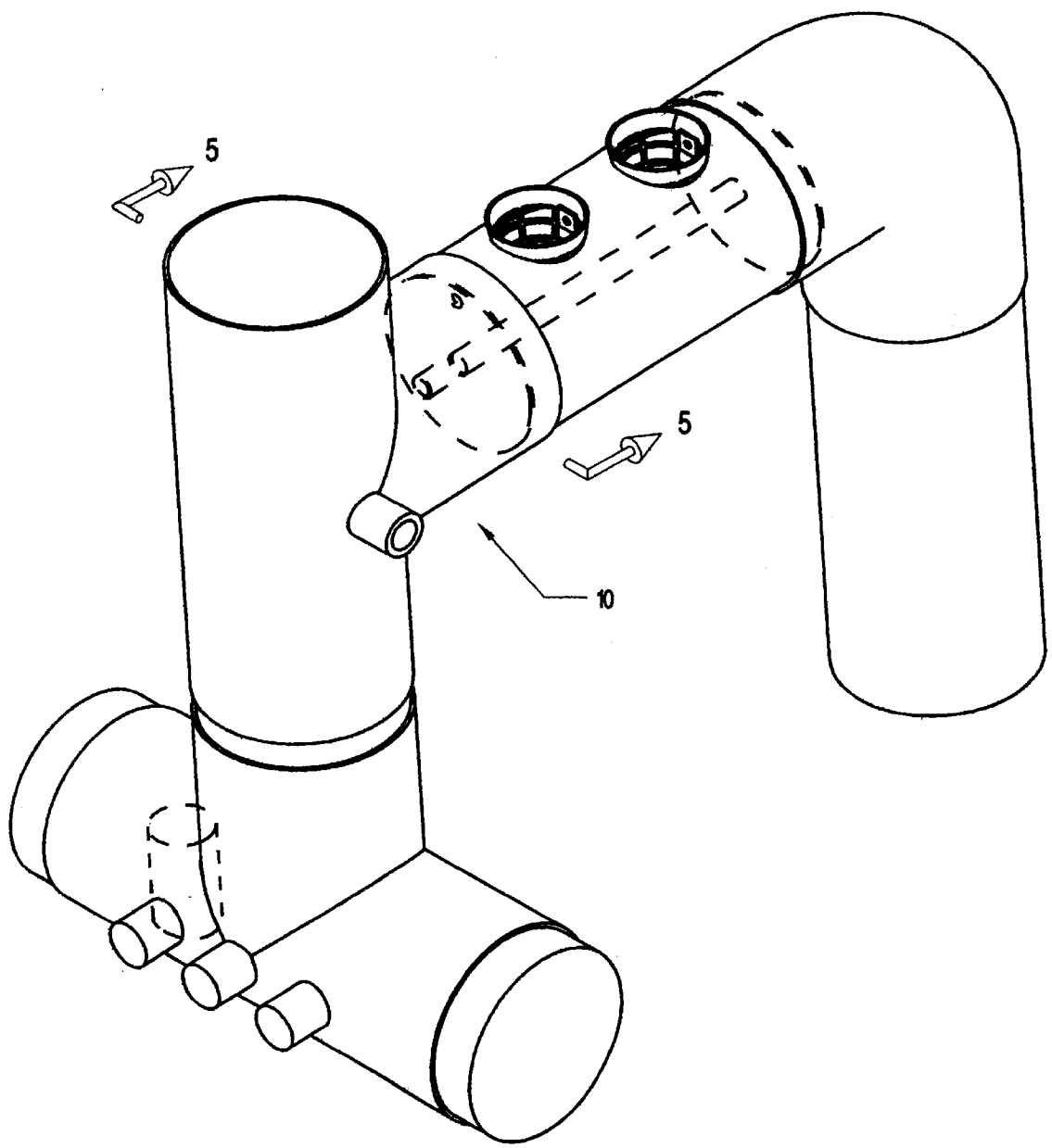
FIG. 1 is an isometric view of the preferred embodiment of the improved hydroponic device. The pump, baffle bulkhead, solid bulkhead, and a portion of a plumbing line are shown in hidden lines.
Figure 2:
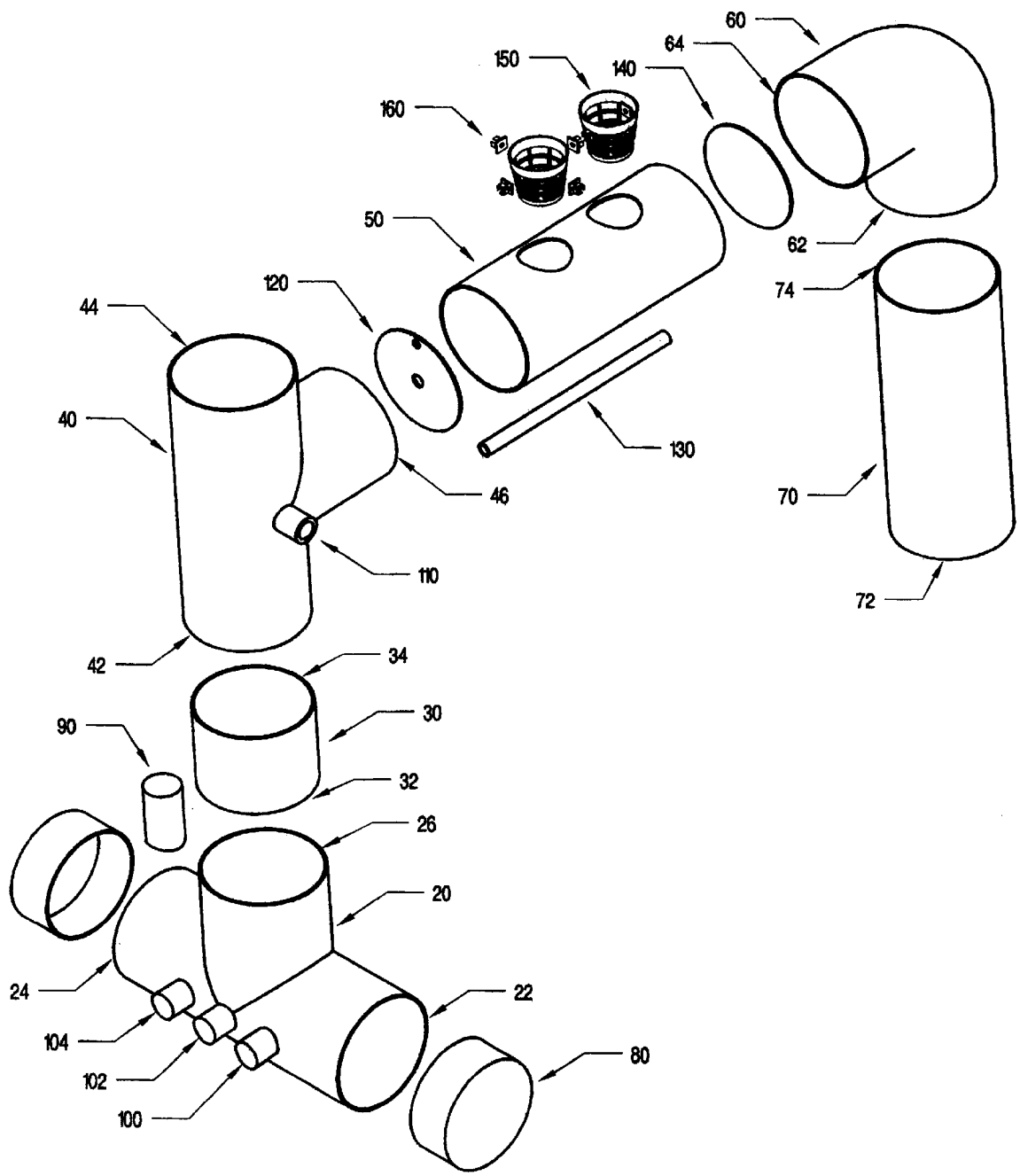
FIG. 2 is a partially exploded isometric view of the preferred embodiment. One plant support basket is shown with basket brackets inserted, and the other basket is shown with basket brackets exploded from both tightened and untightened positions.
Figure 3:
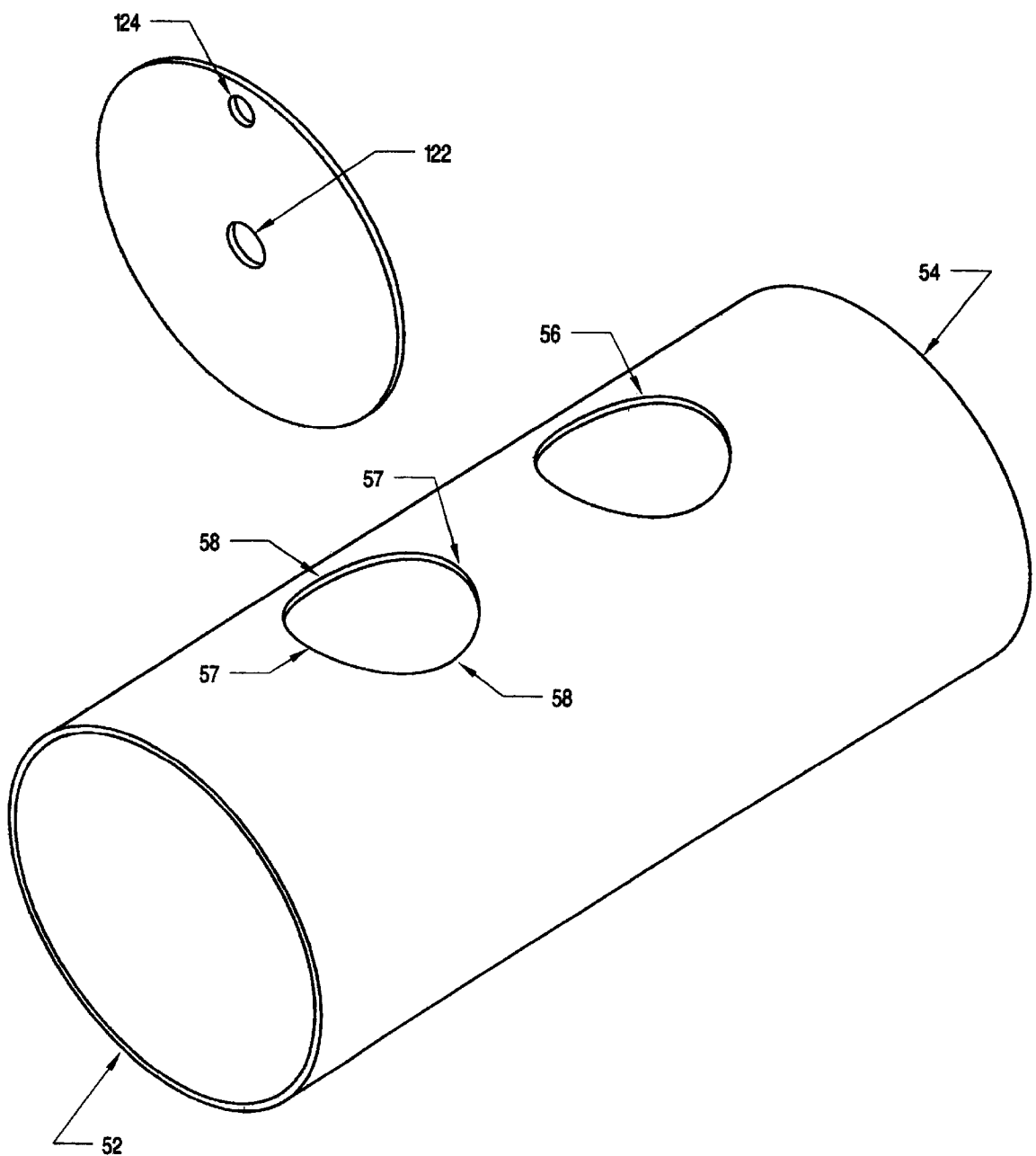
FIG. 3 is an enlarged view of the baffle bulkhead and the grow tube as shown in FIG. 2. The two parts have been rearranged in their spatial relationship to facilitate a larger scale view.
Figure 4:
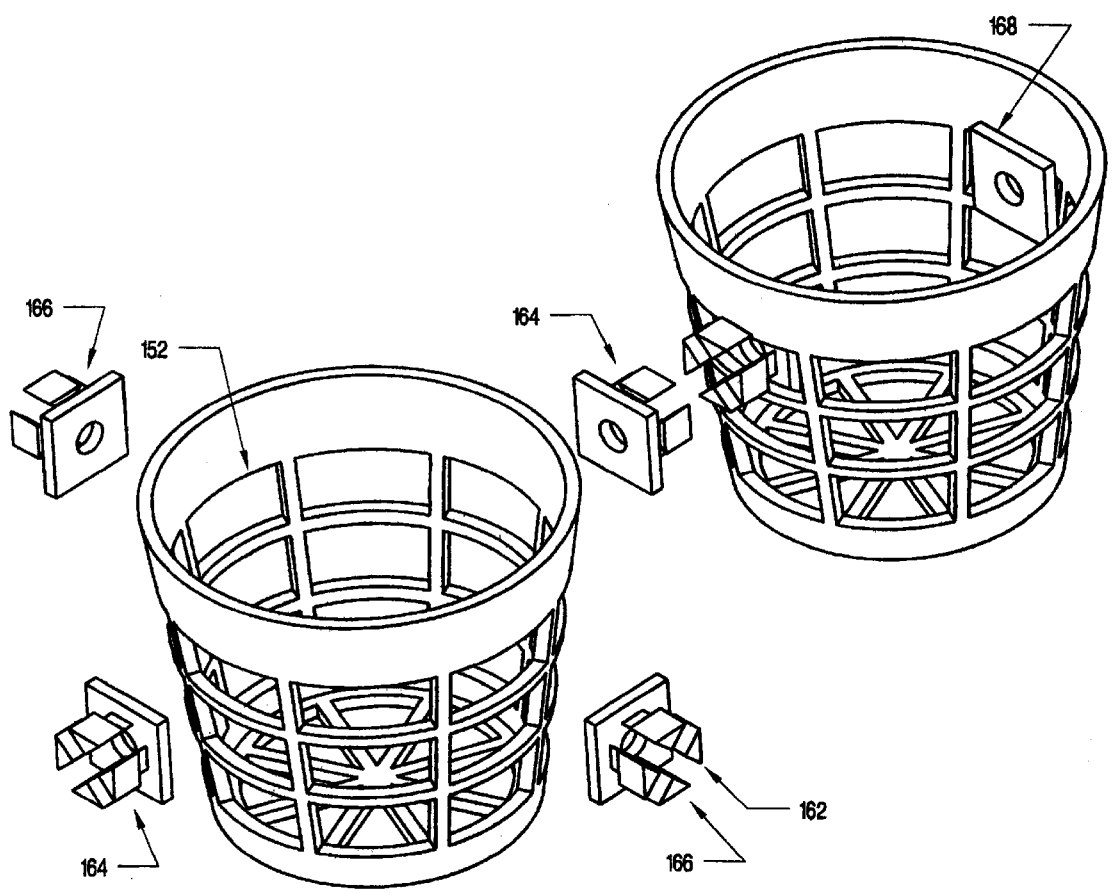
FIG. 4 is an enlarged view of the plant support baskets and basket brackets as shown in FIG. 2.
Figure 5:
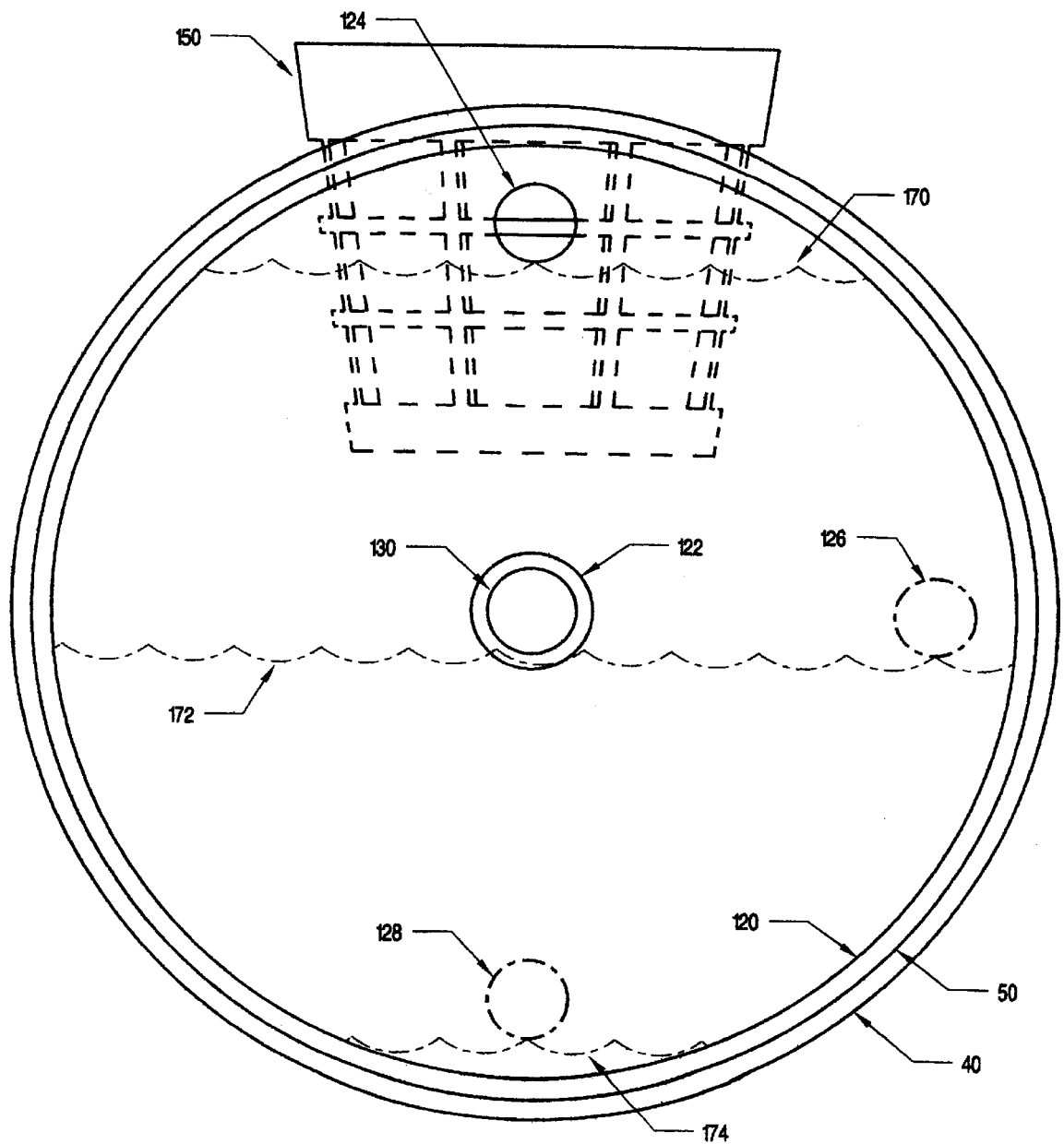
FIG. 5 is an section cut of the improved hydroponic device taken at the location and orientation noted in FIG. 1. In addition to displaying the upper tee member, grow tube, baffle bulkhead, and nutrient supply tube as cut at the section noted, the figure also includes a plant support basket which is shown in hidden lines where the view of the basket is blocked by the view of the other members. Liquid passage openings and corresponding liquid levels are shown at three different adjustments of the baffle bulkhead.

In practice, a liquid nutrient solution is added to the hydroponic device through upper tee upper opening 44 or the nutrient alone is added through upper tee upper opening 44 and water is added through fill/overboard port 110. When the valves 100, 102, and 104 are set to the mix/filter mode, the nutrient solution is mixed and cleaned. When the valves 100, 102, and 104 are set to the feed mode, the nutrient solution is pumped at predetermined intervals to plant support baskets 150. The liquid nutrient solution then runs through any plant within plant support baskets 150 and begins to fill grow tube 50. Upon the liquid nutrient solution reaching the liquid passage port 124, the liquid nutrient solution passes into upper tee 40, through connecting sleeve 30, and back into lower tee 20. When the valves 100, 102, and 104 are set to the overboard evacuation mode, the nutrient solution is pumped to the fill/overboard evacuation port, and the hydroponic device is emptied. As can be understood from reference to FIG. 5, when baffle bulkhead 120 is rotatably adjusted to a nominal position, liquid passage opening 124 is near the top of grow tube 50 and the liquid level in grow tube 50 is nearly full as shown by liquid level 170. When baffle bulkhead 120 is rotatably adjusted to a first alternate position, the liquid passage opening is at a position as noted by 126, and the liquid level in grow tube 50 is substantially half full as shown by liquid level 172. When baffle bulkhead 120 is rotatably adjusted to a second alternate position, the liquid passage opening is at a position as noted by 128, and the liquid level in grow tube 50 is nearly empty as shown by liquid level 174. It will also be understood that various quantities of liquid passages combined with a baffle bulkhead adjusted to various positions will result in virtually any desired liquid level. Accordingly, the improved hydroponic device is especially suited for adapting to various grow method such as changing from a drip grow method to an ebb and flow grow method. Because pressure equalizing liquid harnesses 180 and 182 employ redundant or parallel liquid passage lines 176, pressure in lines 176, which feed liquid to grow tubes 50 and plant support sites 150 respectively, is equalized. In comparison to such pressure equalization, devices which merely employ singular or series liquid passage lines require a greater increase in pressure commensurate to each additional grow tube or plant support site or the like which is fed with liquid.

This equalization in pressure avoids the pressure differential that is otherwise encountered in series plumbed type hydroponic devices. The equalization in pressure avoids the greater additional pressure requirement per additional tube or site or the like, and thus reduces the overall pressure required by hydroponic device 10 compared to what the pressure would otherwise be if hydroponic device 10 merely employed singular or series liquid passage lines. Such reduction in required pressure increases the overall efficiency of the hydroponic device 10 by reducing the required strength of the various lines, fittings, and members that make up device 10, by reducing the output required by pump 90, and by reducing the energy consumption of pump 90.

It will be noted that the majority of the parts required to construct the hydroponic device are readily available off the shelf parts. In the preferred embodiment, the tees, sleeves, elbow, and end caps are all six inch nominal diameter PVC pipe sections and the basket brackets are commonly available grommets.

While there is shown and described herein certain specific structure embodying the invention, it will be manifest to those skilled in the art that various modifications and rearrangements of the parts may be made without departing from the spirit and scope of the underlying inventive concept. The subject invention is not limited to the particular forms herein shown and described except insofar as indicated by the scope of the appended claims.

I claim:

1. An improved adjustable hydroponic device wherein said device comprises a container defining a substantially tubular shaped reservoir including at least one plant site opening, an adjustable substantially disk shaped baffle defining a bulkhead including at least one liquid passage opening, and at least one plant support device, said baffle being sealingly and adjustably mounted within said reservoir, said at least one plant support device being mounted within said at least one plant site opening, and wherein adjustment of said baffle causes an adjustment to at least one of the following group of items consisting of containable liquid level within said reservoir and flow rate of liquid from within said reservoir.

2. The improved hydroponic device of claim 1 wherein when said baffle is in a first position, said baffle prevents a predetermined amount of liquid from escaping said reservoir, and wherein when said baffle is in a second position, said baffle allows the liquid contents of said reservoir to empty.

3. The improved hydroponic device of claim 1 wherein said container defines an assembly of sealingly and removably connected PVC tubes, said tubes being of substantially similar diameters.

4. An improved modular hydroponic device wherein said device comprises a container defining a reservoir assembly of a plurality of sealingly attachable and detachable hollow cylinders, said cylinders including at least one plant grow cylinder and a pump containing cylinder, said plant grow cylinder including at least one plant site opening and at least one plant support device removably retained within said at least one plant site opening, said pump containing cylinder defining a lower portion of a tee shaped base member consisting of hollow cylinders intersectingly connected at a substantially 90 degree intersection, and wherein the quantity of said plant support devices are readily modified by increasing or decreasing the quantity of plant grow cylinders.

5. The improved hydroponic device of claim 4 wherein said container assembly defines an assembly of PVC tubes, said tubes being of substantially similar diameters.

6. An improved hydroponic device wherein said device includes an outer container defining an assembly of sealingly connected hollow tubes, and wherein said tubes includes at least one grow tube and at least one reservoir tube and wherein said reservoir tube defines a lower portion of a tee shaped base member consisting of hollow tubes intersectingly connected at a substantially 90 degree intersection.

7. The improved hydroponic device of claim 6 wherein said tubes define PVC tubes of substantially similar diameters.

* * * * *